United States Patent [19]

Neracher

[11] 4,292,600
[45] Sep. 29, 1981

[54] PULSED GAS LASER EMITTING HIGH-POWER BEAM OF SHORT WAVELENGTH

[75] Inventor: Arnold Neracher, Geneva, Switzerland

[73] Assignee: Battelle Memorial Institute, Geneva, Switzerland

[21] Appl. No.: 808,525

[22] Filed: Jun. 21, 1977

[30] Foreign Application Priority Data

Jun. 23, 1976 [CH] Switzerland ............. 8009/76

[51] Int. Cl.$^3$ ............................................. H01S 3/097
[52] U.S. Cl. .......................... 331/94.5 G; 331/94.5 D; 331/94.5 PE
[58] Field of Search ............ 331/94.5 G, 94.5 PE, 331/94.5 D

[56] References Cited

U.S. PATENT DOCUMENTS

| | | | |
|---|---|---|---|
| 3,821,664 | 6/1974 | Godard et al. | 331/94.5 PE |
| 3,828,277 | 8/1974 | Otto et al. | 331/94.5 PE |
| 4,039,971 | 8/1977 | Wang et al. | 331/94.5 PE |
| 4,114,113 | 9/1978 | Hanson et al. | 331/94.5 PE |
| 4,166,252 | 8/1979 | Salzmann et al. | 331/94.5 D |

FOREIGN PATENT DOCUMENTS 2528174 12/1976 Fed. Rep. of Germany ..... 331/94.5 PE

OTHER PUBLICATIONS

Sam, Applied Physics Letters, vol. 29, No. 8, Oct. 15, 1976, pp. 505–506.
Herden, Physics Letters, vol. 54A, No. 1, Aug. 11, 1975, pp. 96–99.
Graf, Modern Dictionary of Electronics, (H. W. Sams Co., Indianapolis) 4th Ed., 1972, "Ceramic Capacitor".
Nagata et al., "Compact high-power nitrogen laser", Journal of Physics E, 1973, vol. 6, pp. 1193–1195.
Strohwald et al., "Picosecond UV Laser Pulses . . . ", Applied Physics Letters, vol. 28, No. 5, Mar. 1, 1976, pp. 272–274.

Primary Examiner—William D. Larkins
Attorney, Agent, or Firm—Karl F. Ross

[57] ABSTRACT

A laser designed to emit a pulsed beam of short wavelength comprises two bodies of nonconductive material within a cylindrical housing, at least one of these bodies being a flat ceramic disk with a high dielectric constant. A narrow interspace between the two bodies is occupied by two coplanar metal layers with confronting rectilinear edges forming an elongate excitation cavity between them, these layers being galvanically interconnected through an inductance and constituting a pair of capacitors with a common metal layer on the opposite face of the ceramic disk. One of the coplanar layers is connected to a source of high potential, the other of these layers being intermittently energizable by a generator of trigger pulses to excite a gas filling the elongate cavity.

12 Claims, 16 Drawing Figures

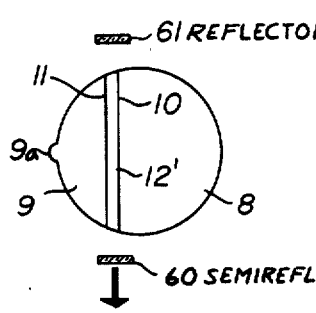
FIG. 9a
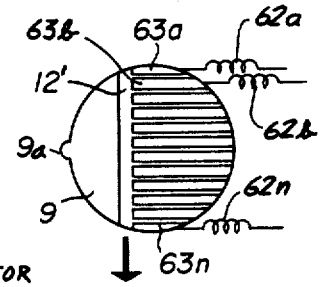
FIG. 9b
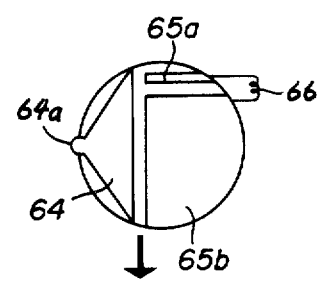
FIG. 9c
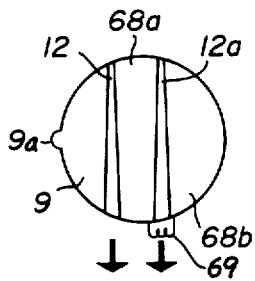
FIG. 9d
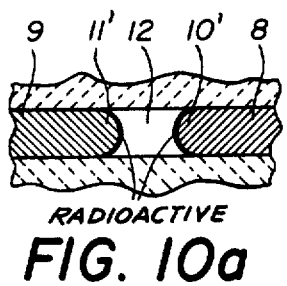
FIG. 10a
FIG. 10b
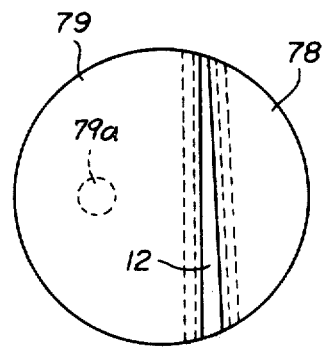
FIG. 12
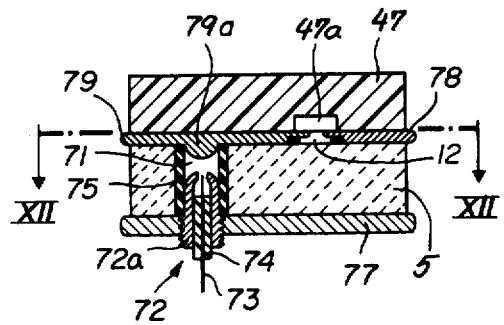
FIG. 11

PULSED GAS LASER EMITTING HIGH-POWER BEAM OF SHORT WAVELENGTH

FIELD OF THE INVENTION

My present invention relates to a pulsed gas laser operating with transverse electrical excitation.

BACKGROUND OF THE INVENTION

Lasers using a gas as the radiation-emitting medium can generate pulsed beams of very short wavelengths, ranging from the near to the far ultraviolet, upon stimulation of the gas by high-intensity electrical discharges of very short duration. With nitrogen, carbon dioxide or hydrogen as the emitting gas, for example, wavelengths of 3370, 1930, 1600 and 1200 A can be generated.

The gas present in an elongate cavity can be stimulated with either of two modes of electrical excitation, i.e. longitudinally with the aid of a pair of electrodes at opposite ends of the cavity or transversely by means of two electrodes paralleling the optical cavity axis. Transverse excitation is known to be more efficient and is therefore usually preferred.

Conventional systems for causing such transverse excitation utilize conductor strips sometimes referred to as Blumlein lines. Such strip lines, generally consisting of metal foils separated by insulating material of low dielectric constant (e.g. Mylar), serve to convey the electrical excitation pulses in properly phased relationship to the electrodes flanking the cavity; they may be given, for this purpose, a variety of configurations with rectangular, triangular, segmental or paraboloidal outline, for example. In all these instances, however, the coupling between the source of excitation pulses and the laser cavity creates problems, especially with UV radiation which requires a low impedance of the discharge circuit and steep pulse flanks compatible with the short transition periods of such high-frequency lasers. The solutions heretofore adopted call for the storage of large amounts of electrical energy with the aid of sizable capacitors, resulting in a bulky structure which is only limitedly manipulable and creates difficulties of electrical insulation and of shielding against the emission of objectionable noise signals. Even with discharge lines formed from a series of capacitors with ceramic bodies having a high dielectric constant, as already proposed for improving the efficiency of a gas laser, no significant reduction in the overall dimensions of such structures has been realized up to now. Moreover, the piezoelectric properties of ceramic dielectrics convert electric pulses into acoustic shock waves which tend to cause cracks in the bodies of such capacitors.

OBJECTS OF THE INVENTION

The general object of my present invention, therefore, is to provide a more compact structure for a laser of the kind discussed above, especially one designed to emit radiation in the UV range.

A more particular object is to provide an integrated laser structure less susceptible to cracking in response to piezoelectric shock waves.

SUMMARY OF THE INVENTION

I have found, in accordance with my present invention, that these objects can be realized by the provision of a pair of flat nonconductive bodies separated by a narrow interspace, at least one of the bodies being a member with opposite major faces, referred to hereinafter as a disk, of a solid—preferably ceramic—material having a high dielectric constant. A face of the disk remote from the interspace carries a first metallic layer which forms a storage capacitance with a second metallic layer overlying part of the other disk face within the interspace, a pulse-shaping capacitance being constituted by the first metallic layer and a third metallic layer overlying another part of the last-mentioned disk face in the interspace; the second and third layers, which are coplanar with each other, have substantially rectilinear confronting edges which define an elongate laser cavity within that interspace. The two coplanar metallic layers, galvanically interconnected by an inductance, are charged to a high constant voltage by a direct-current source connected between the first and second layers; excitation pulses are periodically generated between the first and third metallic layers to stimulate a gas in the laser cavity into the emission of radiation. The entire assembly is enclosed in a housing which seals at least the laser cavity against the surrounding atmosphere.

If both nonconducting bodies are more or less identical disks of similar dielectric material, a fourth metallic layer disposed on the face of the second disk remote from the gap and electrically connected in parallel with the first layer will substantially double the storage and the pulse-shaping capacitance of the laser. Advantageously, in order better to withstand the piezoelectrically generated shock waves, the disk or disks are circularly cylindrical with an outer diameter ranging between a few millimeters and about 50 cm.

For optimum performance, I prefer to use for the disk body a ceramic material with a dielectric constant of at least 80. Suitable ceramic compositions of this nature consist essentially of ferroelectric materials such as barium titanate in pure or doped form, e.g. with the addition of $Pb(Ti,Zr)O_3$, $BaO-TiO_2-Al_2O_3$, $PbZrO_3$, $PbHfO_3$, $PbTiO_3$, $CaTiO_3$, $La^{3+}$, and/or $Nb^{5+}$. Other dielectrics in this class include, for example, $TiO_2$, $LiNbO_3$ and KDP (potassium dideuterophosphate $KH_2PO_4$), possibly in its activated form (KD*P).

I have found that ceramic disks of this type can sustain charging voltages between 1 and 100 kV. Because of the greater susceptibility of ceramic materials to acoustic shock, the thickness of the disk may have to exceed that of the more commonly used low-dielectric-constant materials such as Mylar by about one order of magnitude. Even so, since the capacitance of an electrical condenser varies linearly with its dielectric constant and inversely with its thickness, the higher dielectric constant increases the capacitance of these metal-coated ceramic disks to such an extent that, for a given charge to be stored, their dimensions can be significantly smaller (by up to 3 orders of magnitude) than those of the conventional discharge lines. With thicknesses ranging between about 1 and 30 mm, circularly cylindrical disks of barium titanate, titanium dioxide and KDP may have outer diameters of about 10 to 200 mm, 100 to 500 mm and 5 to 30 mm, respectively.

The use of such high-dielectric-constant materials also leads to a considerable reduction in the characteristic impedance of the discharge lines, this characteristic impedance being proportional to the thickness of the disk body and inversely proportional to the square root of its dielectric constant. Thus, the current rises more rapidly in the laser cavity, bringing about a higher current density, electron temperature and population-inversion rate with consequent augmentation of the output and the peak power of the laser.

The stimulated emission of radiation requires a certain minimum value for the length of the laser cavity, this threshold varying inversely with the initial density of population inversions as established by recent studies. Thus, the reduction in the characteristic line impedance has the added advantage of lowering that threshold of length, thereby further reducing the dimensions of the structure. The studies referred to have also revealed the existence of a nonlinear relationship between the peak output power and the length of the cavity, a lengthening of the cavity resulting in an at first exponential and then linear rise of this peak power which eventually approaches a saturation level. It follows that, contrary to the prevailing opinion, the laser cavity need not be very long in order to yield satisfactory magnitudes of peak power.

The dielectric constant of ceramic materials is known to vary with temperature and to attain a maximum value in the vicinity of the Curie point of that material. The selection of a ceramic material with a Curie point close to or a little higher than the ambient temperature, therefore, eliminates the need for a control of the temperature level within the laser housing. With high pulse rates, however, the rapidly recurring discharges tend to heat the dielectric to a temperature well above ambient so that in such instances it is usually preferable to work with a material having a higher Curie point. A desired value for the Curie point can be established by suitable doping, as is well known. With certain materials, however, considerably lower operating temperatures and Curie points are desirable; in the case of KDP (of formula $KH_2PO_4$), for example, its high dielectric constant at $-150°$ C. allows the realization of a particularly compact structure if the temperature of the dielectric is maintained at or near that level by thermoelectric means such as Peltier cells.

A variety of gases are available in pure form for the emission of stimulated radiation, such as nitrogen with an emission wavelength of 3371 A (corresponding to an electrical transition $C^3\pi \rightarrow B^3\pi$), hydrogen with emissions of 1610 and 1200 A (corresponding to transitions $B^1\Sigma \rightarrow X^1\Sigma$ and $C^1\pi \rightarrow X^1\Sigma$, respectively), carbon dioxide with an emission of 1930 A (transition $A^1\pi \rightarrow X^1\Sigma$), deuterium with an emission of 1615 A (transition $B^1\Sigma_u^+ \rightarrow X^1\Sigma_g^+$), neon with an emission of 5401 A, as well as activated gases such as KrF*, XeF*, ArCl*, ArF* and KrCl* with emissions of 2845, 3540, 1750, 1933 and 2229 A, respectively. The active medium could also be a gas mixture, e.g. helium and nitrogen with an emission of 4278 A (transition $B^2\Sigma_u^+ \rightarrow X^2\Sigma_g^+$), nitrogen and sulfur fluoride with an emission of 3577 A, or air at atmospheric pressure, for example. In general, I may employ pressures p between about $10^{-3}$ torr and 30 bars with any of the aforementioned gases or gas mixtures; in order to obtain relatively high concentrations of excitable molecules within the cavity, atmospheric or superatmospheric gas pressures (i.e. upwards of one bar) are preferably used. With a traveling electric field E generated in the cavity, the ratio E/p should lie in a range of about 50 to 300 V/cm·torr. Thus, the width of the laser cavity (i.e. the spacing of the confronting edges of the metallic layers flanking that cavity) should be so chosen as to maintain the ratio E/p within that range.

BRIEF DESCRIPTION OF THE DRAWING

The above and other features of my invention will now be described in detail with reference to the accompanying drawing in which:

FIGS. 9a-9d are schematic views generally similar to FIGS. 2 and 6, illustrating additional modifications;

FIGS. 10a and 10b are fragmentary sectional views similar to FIG. 4, showing different electrode configurations;

FIG. 11 is a view similar to FIG. 7, illustrating another variant;

FIG. 12 is a cross-sectional view taken on the line XII—XII of FIG. 11.

SPECIFIC DESCRIPTION

Figure 1:
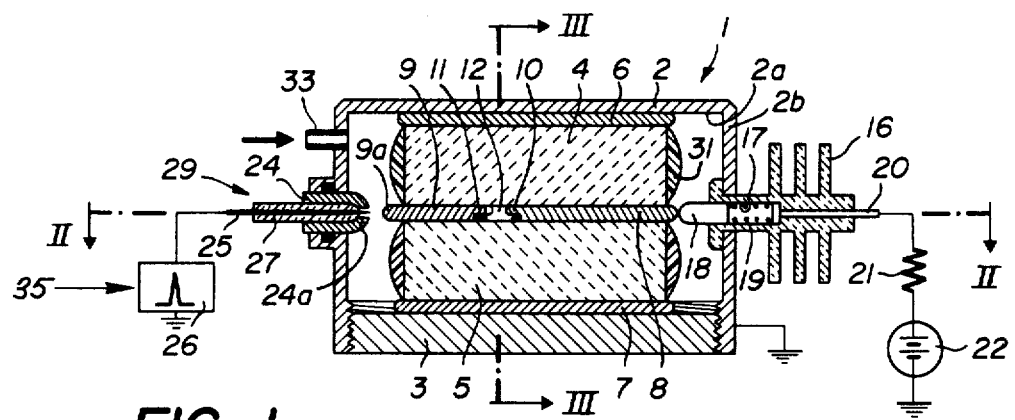
FIG. 1 is an axial sectional view of a laser structure embodying my invention.
Figure 2:
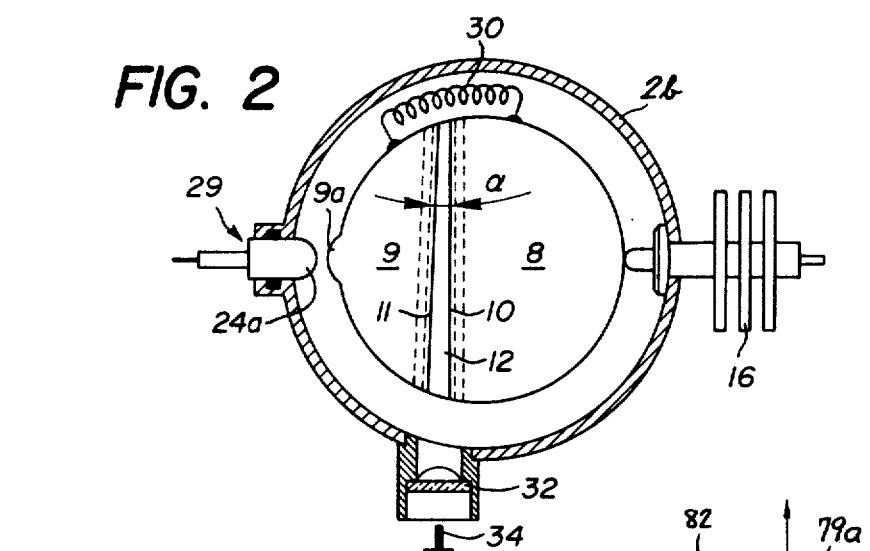
FIGS. 2 and 3 are cross-sectional views taken on the lines II—II and III—III of FIG. 1.
Figure 3:
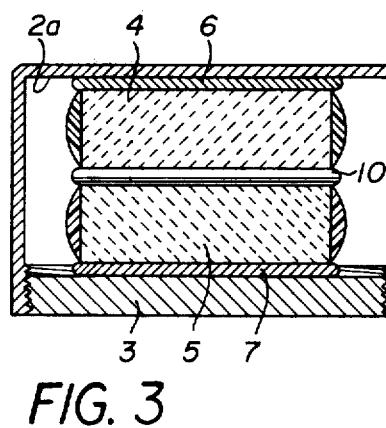

In FIGS. 1-5 I have shown a laser with a fluidtight housing 1 formed from a cylindrical shell 2 with a top 2a and a peripheral wall 2b, the open bottom of the shell being closed by a metallic plug 3 screwed into that peripheral wall. Within housing 1 there are disposed two substantially identical, circularly cylindrical disks 4 and 5 of ceramic material such as barium titanate centered on the housing axis, these disks having outer faces entirely covered by metallic layers 6 and 7. The other disk faces are separated by a narrow axial interspace accommodating two coplanar substantially segment-shaped metallic layers 8 and 9 whose rectilinear confronting edges 10 and 11, diverging at a small angle $\alpha$, define between them an elongate laser cavity 12. The two intermediate layers 8 and 9 are galvanically interconnected by an inductance 30.

Figure 4:
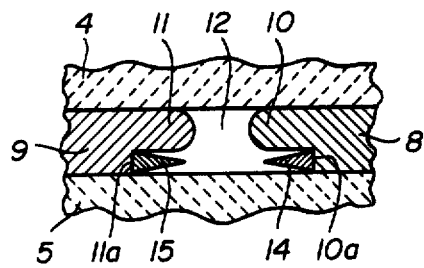
FIG. 4 is a fragmentary axial sectional view showing an electrode assembly of FIG. 1 on a larger scale.
Figure 5:
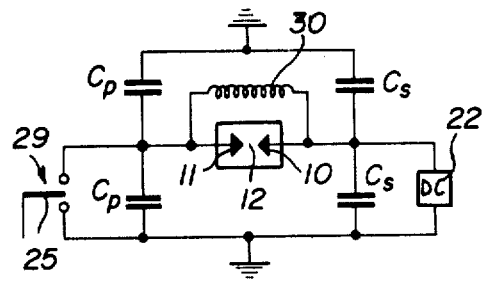
FIG. 5 is a diagram of an equivalent circuit for the system of FIGS. 1-4.

As more clearly shown in FIG. 4, the confronting edges 10 and 11 of the coplanar layers 8 and 9 are rounded and provided with recesses 10a and 11a in which a pair of corona electrodes 14 and 15 are disposed to pre-ionize a gas in cavity 12. Plug 3 maintains the disk bodies 4, 5 and the metal layers 6-10 in firm contact with one another.

An insert 16 of nonconductive material, provided with cooling fins, penetrates the peripheral wall 2b of shell 2 at the level of cavity 12 and at a location substantially midway along the outer periphery of layer 8. A recess 17 of insert 16 forms a seat for a contact element 18 forced against the periphery of layer 8 by a conductive compression spring 19 which bears upon a metal rod 20, the latter being connected via a charging resistor 21 to a terminal of a high-voltage direct-current source 22 whose other terminal is grounded, as are the outer layers 6 and 7 through the intermediary of shell 2 and plug 3. Source 22 is thus connected across a pair of storage capacitors $C_s$, whose plates are the layers 6-8, and across a pair of pulse-shaping capacitors $C_p$ whose plates are the layers 6, 7 and 9, as seen in the equivalent-circuit diagram of FIG. 5.

At a location diametrically opposite contact member 18, substantially midway along the periphery of layer 9, a spark gap is formed between a bulge 9a of layer 9 and a starting electrode 25 constituted by a metal pin which is held by an insulating sleeve 27 in a discharge electrode designed as a conductive jacket 24 penetrating the shell wall 2b. Discharge electrode 24 has a circularly or ellipitically rounded mouth 24a which surrounds the tip of electrode 25 and may project slightly therebeyond, electrodes 24 and 25 being part of a trigger circuit 29 further including a generator 26 of high-voltage spikes effectively connected between starting electrode 25 and housing 1. The gas to be excited in cavity 12, admitted under a desired pressure into housing 1 through a port 33, is also present in the region of the spark gap existing between the discharge electrode 24 and a counterelectrode represented by bulge 9a.

A window 32, located in shell periphery 2b in line with cavity 12, is transparent to the laser beam issuing from the wider exit end of that cavity as indicated by an arrow 34. Window 32 may be a pane of glass or lithium fluoride.

Disks 4 and 5 are sheathed by insulated peripheral coatings 31, advantageously consisting of silicone. The inner walls of housing 1 and the surfaces of the various conductive elements disposed therein are advantageously provided with silver coatings.

In operation, upon connection of source 22 across metal layers 6–9, the capacitances $C_s$ and $C_p$ are rapidly charged to the d-c voltage of that source. At the desired instant, pulse generator 26 is actuated by a signal symbolized by an arrow 35 to ionize the zone between electrode 25 and jacket mouth 24a, thereby breaking down the spark gap between electrodes 25 and 9a. Voltage waves are now transmitted from the spark gap to edge 11 to set up an electric discharge across cavity 12, of high intensity and very short duration, advancing from the narrower end of that cavity to its wider end adjoining the window 32. The resulting population inversion gives rise to a stimulated emission of radiation, amplified in its passage along the cavity, whereby a powerful light pulse traverses that window in the direction of arrow 34. Upon termination of the discharge, pulse generator 26 remains quiescent until the signal 35 recurs.

With the spacing of excitation electrodes 10, 11 determined by the ratio E/p as discussed above, a desired volume of cavity 12 can be obtained by selecting the height of the interspace separating the disks 4 and 5, i.e. the thickness of the intervening metal layers 8 and 9.

The following data are given by way of example for the system shown in FIGS. 1–4.

| Mechanical Parameters | |
|---|---|
| Diameter of each ceramic disk 4,5: | 40 mm |
| thickness of each disk: | 12 mm |
| ceramic material: | doped $BaTiO_3$ with dielectric constant of 6000 at Curie point (40° C.) |
| metal layers 6-9: | copper of 2 mm thickness |
| dimensions of cavity 12: | |
| width at narrower rear end | 1.6 mm |
| width at wider front ent | 1.9 mm |
| length | 38 mm |
| height | 2 mm |
| corona electrodes 14,15: thickness | 0.1 mm |

| -continued | |
|---|---|
| radius | $10^{-3}$ mm |
| diameter | 10 mm |
| radius of curvature at mouth 24a | abt. 100–200 mm. |
| Electrical Parameters | |
| Maximum charge voltage V: | 30 kV |
| line capacitance $C = 2C_p + 2C_s$: | $4.4 \times 10^{-9}$F |
| stored energy $E = \frac{1}{2}CV^2$: | 2 joules |
| characteristic line impedance: | 1.7 mΩ/meter |
| overall line impedance: | 36 mΩ |
| inherent inductance of spark generator: | 0.2 nH. |
| Laser-Emission Parameters | |
| Gas: | $N_2$ of 99.99% purity |
| emission wavelength: | 3371 A |
| threshold length of cavity: | abt. 1 cm |
| pulse cadence: | 0.1 to 100 Hz |
| applied charging voltage: | 18 kV |
| gas pressure in laser cavity (in bars): | 6   3.5   2   1 |
| pulse duration (in picoseconds): | 50   150   500   950 |
| pulse energy: | 70 microjoules |
| peak power: | 1.4 megawatts. |

These values apply to operation in the superradiant mode (without resonator) in which the light pulses are not subjected to multiple reflections.

From the foregoing data it will be apparent that the reduction in the dimensions of the overall structure, and in particular of the laser cavity, realized by my present invention goes far beyond what could be expected from a mere substitution of materials of higher dielectric constant for those generally employed in the prior art. Thus, the shortening of the transmission paths made possible by the improved capacitor design entails a lowering of the characteristic line impedance which, in turn, steepens the pulse flanks and accelerates the population inversions, thereby reducing the critical mininum for the length of the cavity.

The angular inclination of window 32, corresponding to Brewster's law, avoids any parasitic reflection.

If conventional discharge lines with Mylar as the dielectric were employed in a system with the same peak power, the structure would have to be about 1000 times as voluminous and weigh approximately 150 times as much.

Figure 6:
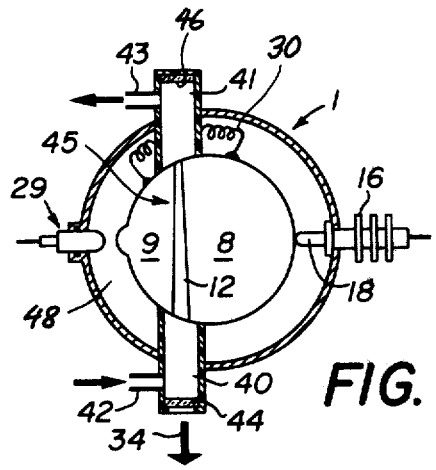
FIG. 6 is a view similar to FIG. 2, illustrating a modification.

In FIG. 6 I have illustrated a modification of the preceding embodiment enabling the gas of the laser cavity to be different from that present elsewhere in the housing, particularly in the region of the spark gap. Here, cavity 12 opens at its wider end into a chamber 40 and at its narrower end into a chamber 41, the two chambers being provided with an inlet 42 and an outlet 43 for the radiation-emitting gas. Chamber 40 has a window 44, similar to window 32 of FIGS. 2 and 3, for sending out the laser beam; chamber 41 is shown provided with a mirror 46 for reflecting rearward-traveling radiation back into the cavity. Chambers 40 and 41, made of insulating material, define with cavity 12 a linear compartment 45 sealed against the atmosphere and fluidically separated from the remainder of housing 1. Thus, an annular compartment 48 containing the spark gap can be filled with a gas (e.g. nitrogen or sulfur fluoride under pressure) selected for its insulating properties and its ionizability by the trigger pulses from circuit 29.

With the arrangement of FIG. 6 it is thus possible to operate with different types of gases and/or different gas pressures in the laser cavity and at the spark gap. With a low pressure in the laser cavity 12 and a high pressure in the surrounding space 48, for example, the quotient E/p can be increased to let the gas be pumped with a very high kinetic energy; with $E/p<100$ V/cm·torr, radiation wavelengths of less than 1000 Å can be obtained.

Figure 7:
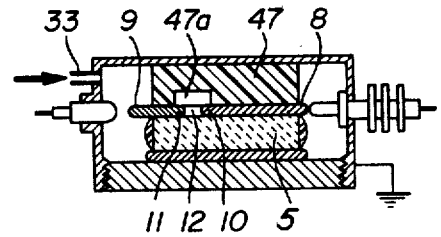
FIG. 7 is an axial sectional view similar to FIG. 1, representing another embodiment.

FIG. 7 shows a simplified embodiment utilizing only one ceramic disk, here the lower disk 5, with replacement of the upper disk 4 and its top layer 6 by a body 47 of insulating material such as a polyacrylate (Plexiglas) having a dielectric constant of less than 4. Body 47 has a recess 47a of prismatic configuration overlying the space between electrodes 10 and 11 to form an extension of laser cavity 12. This system is less efficient than that of the preceding Figures, having only half the storage capacity and twice the characteristic impedance thereof under otherwise equal conditions, yet its simpler layout reduces its cost. In this case, too, the laser cavity may be fluidically separated from the region of the spark gap as described with reference to FIG. 6.

Figure 8:
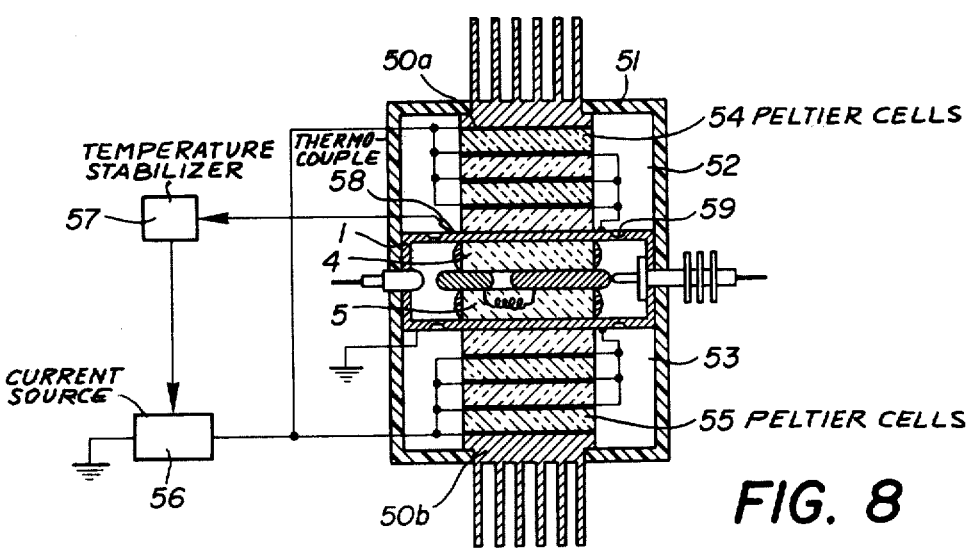
FIG. 8 is an axial sectional view of a further embodiment.

As shown in FIG. 8, the assembly of FIGS. 1-4 can be enclosed in a cylindrical outer casing 51 of insulating material, e.g. of synthetic resin, extending symmetrically above and below housing 1. (With an unsymmetrical structure of the type illustrated in FIG. 7, the upper half of casing 51 would be omitted.) Casing 51 forms an upper and a lower temperature-control chamber 52, 53 accommodating respective stacks of Peltier cells, made of a thermoelectrically effective material such as BiTe absorbing heat from disks 4 and 5 through the top and bottom walls of housing 1 here shown to be in direct contact with the ceramic disks, with omission of layers 6 and 7. An annular groove 59 in each of these housing walls serves as a heat barrier. The Peltier cells 54 and 55 are energized from a current source 56 under the control of a temperature stabilizer 57 connected to a temperature sensor 58, such as a thermocouple, in contact with one of the housing walls adjoining the stacks 54, 55. Heat abstracted by the Peltier cells from the disks 4 and 5 is dissipated by metal plates 50a, 50b provided with outwardly extending cooling fins.

The arrangement of FIG. 8 enables the maintenance of a ceramic with a low Curie point, such as KDP, at its optimum operating temperature.

The ungrounded condenser plates represented in the foregoing embodiments by metal layers 8 and 9 may assume various configurations, some of which have been illustrated in FIGS. 9a-9d. In FIG. 9a the confronting edges 10 and 11 of segmental layers 8 have been shown parallel to each other, rather than diverging toward an exit end, to form a laser cavity 12' of constant width; a mirror 61 at the rear end of this cavity reflects the backward-traveling radiation toward the front end. A semireflecting mirror 60 may be provided at this front end to operate the cavity in a pure oscillating mode which heretofore could not be realized with transverse excitation, i.e. monomode $TEM_{00}$.

In FIG. 9b the larger segmental layer 8 of FIG. 9a has been subdivided into an array of conductor strips 63a, 63b, . . . 63n, perpendicular to cavity 12', which are connected to the high-voltage supply 22 (FIG. 1) through a series of inductances 62a, 62b, . . . 6n whose function it is to delay the recharging of any elemental capacitor formed by these strips. The spaces between the strips may be empty if the cavity is not to be fluidically insulated. This arrangement enables the generation of laser pulses having a duration on the order of a picosecond.

As indicated in FIG. 9c, segmental layer 9 can be replaced by a layer 64 of triangular outline, provided with a bulge 64a serving as the counterelectrode of the spark gap. This Figure also shows that the other segmental layer may be subdivided into a major portion 65b, engaged by the contact element 18 of FIG. 1, and a small conductor strip 65a connected to portion 65b via an inductance 66 and forming part of an elemental capacitor whose discharge produces a supplemental excitation pulse or "afterkick".

In FIG. 9d the larger segmental layer has been split into two sections 68a and 68b, interconnected by an inductance 69, which define a second cavity 12a alongside cavity 12. The two cavities 12 and 12a, opening onto a common window or separate windows, deliver laser pulses relatively offset by an interval dependent on the width of section 68a. This interval can be rather substantial, on account of the fact that the propagation speed of the electric waves across the disk faces is less than along the discharge lines of conventional lasers. Naturally, three or more cavities could be formed in an analogous manner on the same ceramic substrate to generate triple, quadruple etc. laser pulses, again with inductive interconnection of the several cavity-defining layer sections.

As shown in FIG. 10a, layers 8 and 9 (or their equivalents) may have nonrecessed rounded edges 10', 11' without corona electrodes 14, 15 (FIG. 4), these edges being then advantageously coated with a radioactive substance such as Sr90 whose beta emission pre-ionizes the cavity. FIG. 10b illustrates the possibility of using flat-edged layers 8', 9' with centrally disposed corona electrodes 14', 15', providing a homogeneous ionization with gas pressures up to about 760 torr.

Various modifications of the trigger circuit, designated 29 in preceding Figures, are also possible. With the use of a gaseous dielectric whose nature and/or pressure differs from that of the radiation-emitting gas, as discussed above, the starting electrode 25 may be omitted with direct connection of a discharge electrode to a pulse generator; the spark gap fires as soon as the voltage thereacross reaches the breakdown level depending upon the type and pressure of the gas, the width of the spark gap, the geometry of its electrodes and the pulse-generating system used. Such a simplified trigger circuit is less expensive and virtually maintenance-free but is less accurate in the timing of the discharges and the rise of the current pulses. The use of the aforedescribed starting electrode together with the proper gap width obviates the risk of untimely firing, the spark generally following the trigger spike by about 1 to 2 nanoseconds. Aside from a precisely predictable discharge time, a trigger circuit of this nature also has a low impedance on account of the more effective pre-ionization.

The substitution of a solid dielectric for a gas-filled spark gap is also possible. This type of trigger circuit generates steeper pulses but is more costly and allows only for a rather low repetition frequency inasmuch as the solid dielectric must be replaced after each discharge. The utilization of a liquid dielectric affords a higher repetition frequency and a relatively rapid rise in current.

A greatly simplified trigger circuit, consuming less energy, comprises a semiconductor switch such as a thyristor in lieu of a spark generator with gaseous, solid or liquid dielectrics.

Figure 11A:
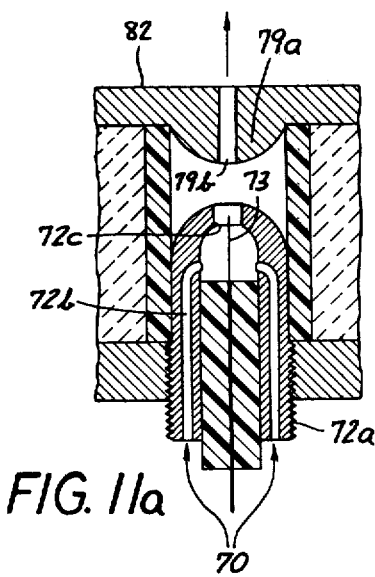
FIG. 11a is a fragmentary axial sectional view of a detail of FIG. 11, drawn to a larger scale.

A spark gap similar to that shown in preceding Figures need not be radially oriented, as heretofore described, but could be axially disposed between the plates of a pulse-shaping capacitor $C_p$ (see FIG. 5), as illustrated in FIGS. 11, 11a and 12. In this instance a laser cavity 12 is formed between two coplanar metallic layers 78 and 79 sandwiched, as in FIG. 7, between a ceramic disk 5 and an insulating body 47 of relatively low dielectric constant forming a recess 47a above that cavity. Layer 79, forming part of the pulse-shaping capacitor, is here larger than the companion layer 78 and has a bulge 79a projecting into a transverse bore 71 of disk 5 lined with an insulating bushing 75 of beryllium oxide, for example. A trigger circuit 72 comprises a discharge electrode in the form of a metallic jacket 72a, screwed into a layer 77 which constitutes the common condenser plate, and a starting electrode 73 connected to a spike generator 26 (FIG. 1), electrode 73 being coaxially held in jacket 72a by an insulating sleeve 74 and functioning in the manner described for electrode 25. The spark gap between discharge electrode 72a and counterelectrode 79a is filled by a volume of gas under pressure which may be sealed in, as shown in FIG. 11, or flowing through as indicated by arrows 70 in FIG. 11a where the jacket 72a is shown formed with passages 72b conveying the gas to a zone 72c around the tip of electrode 73; in the latter instance the gas exits through a bore 79b in layer 72, its flow promoting the transfer of the ionization from zone 72c to the main gap between spark electrodes 72a and 79a. Such a gas flow could also be used in a radial spark gap of the type shown in FIG. 1.

Aside from a significant reduction of the geometrical dimensions of the structure for a given peak power (or, conversely, higher peak powers with a given physical dimensioning), the compactness of my improved laser also results in a significant decrease of radio-frequency noises. The lowering of the characteristic line impedance as well as of the overall circuit impedance permits the application of higher charging voltages accompanied by elevated gas pressures, which in turn makes it possible to obtain very brief pulses with durations on the order of picoseconds or less. An increase in pumping rate and a better quantitative output are also realized. The structure, furthermore, has good mechanical rigidity and a very high acceleration resistance, allowing possible utilization in space vehicles; it also stands up well to periodic temperature variations.

In comparision with conventionally used dielectrics, the ceramic material employed in a laser according to my invention has the further advantages of withstanding corona ionization, having a relatively long service life and being largely insensitive to radioactive radiation; such a laser is thus usable in a radiation-contaminated environment. Finally, this laser can be operated with a high repetition frequency (if necessary, with the aid of a periodic sweepout of the cavity by a transverse gas flow) and has a low power factor at high frequencies.

The various fields of application of a laser according to my invention include the following:
source of excitation for photochemical processes;
plasma analysis for thermonuclear research;
tool for investigating the life spans of excited molecules;
Raman spectrometry;
approach altimeter in aviation;
pumping of liquid laser (for wavelengths between 3500 and 11800 A);
UV-actuated VHV trigger;
portable high-resolution telemetering equipment;
target illumination (tracking or firing);
atmospheric-pollution detector (Raman-laser radar);
measurement of aerosol concentration and relative humidity in the atmosphere;
underwater-communication medium;
carrier of low-frequency signals (up to 20 kHz) over long distances (upwards of 20 km);
ultra-rapid miniature Kerr cell in electro-optical systems;
high-power generator of coherent light at 5401 A;
use in electron optics.

Naturally, the various features of the several embodiments particularly described and illustrated can be used in any compatible combination within the spirit and scope of my present invention.

I claim:

1. A laser comprising:
a pair of flat nonconductive bodies separated by a narrow interspace, at least one of said bodies being a member with two parallel major faces composed of a solid material having a high dielectric constant;
a housing disposed around said bodies and provided with a radiation-transparent window, said housing having a conductive wall portion in full-face contact with a first metallic layer on a major face of said member remote from said interspace;
a second metallic layer in said interspace overlying part of the opposite major face of said member and defining a storage capacitance with said first layer;
a third metallic layer coplanar with said second layer in said interspace overlying another part of said opposite face and defining a pulse-shaping capacitance with said first layer, said second and third layers having substantially rectilinear confronting edges defining an elongate cavity in said interspace; said cavity having an end adjacent said window;
impedance means galvanically interconnecting said second and third layers;
terminal means for connecting a source of charging voltage between said first and second layers; and
circuit means including said conductive wall portion connected between said first and third layers for periodically discharging said pulse-shaping capacitance, thereby exciting a radiation-emitting gas in said elongate cavity.

2. A laser as defined in claim 1 wherein said housing comprises a generally cylindrical enclosure centered on an axis perpendicular to said faces.

3. A laser as defined in claim 2 wherein said circuit means further comprises a trigger circuit including a discharge electrode separated by a spark gap from said third layer.

4. A laser as defined in claim 3 wherein said discharge electrode confronts a counterelectrode on an outer periphery of said third layer.

5. A laser as defined in claim 4 wherein said enclosure has a metallic peripheral wall forming an extension of said conductive wall portion, said discharge electrode being seated in said peripheral wall in conductive contact therewith.

6. A laser as defined in claim 3 wherein said discharge electrode extends from said first layer toward said third layer in a bore of said member transverse to said layers.

7. A laser as defined in claim 3 wherein said trigger circuit further includes a starting electrode spacedly juxtaposed with said discharge electrode.

8. A laser as defined in claim 3 wherein said spark gap is lodged in a compartment fluidically separated from said elongate cavity.

9. A laser comprising:
- a pair of flat nonconductive bodies separated by a narrow interspace, at least one of said bodies being a member with two parallel major faces composed of a ceramic material having a dielectric constant of least 80;
- a first metallic layer on a major face of said member remote from said interspace;
- a second metallic layer in said interspace overlying part of the opposite major face of said member and defining a storage capacitance with said first layer;
- a third metallic layer coplanar with said second layer in said interspace overlying another part of said opposite face and defining a pulse-shaping capacitance with said first layer, said second and third layers having substantially rectilinear confronting edges defining an elongate cavity in said interspace;
- thermoelectric means adjacent said member for maintaining said ceramic material at a temperature close to its Curie point;
- impedance means galvanically interconnecting said second and third layers;
- terminal means for connecting a source of charging voltage between said first and second layers;
- circuit means connected between said first and third layers for periodically discharging said pulse-shaping capacitance, thereby exciting a radiation-emitting gas in said elongate cavity; and
- housing means sealing said elongate cavity against the surrounding atmosphere, said housing means being provided with a window transparent to the emitted radiation adjacent one end of said elongate cavity.

10. A laser comprising:
- a pair of flat nonconductive bodies separated by a narrow interspace, at least one of said bodies being a member with two parallel major faces composed of a ceramic material having a high dielectric constant of at least 80;
- a first metallic layer on a major face of said member remote from said interspace;
- a second metallic layer in said interspace overlying part of the opposite major face of said member and defining a storage capacitance with said first layer;
- a third metallic layer coplanar with said second layer in said interspace overlying another part of said opposite face and defining a pulse-shaping capacitance with said first layer, said second and third layers having substantially rectilinear confronting edges defining an elongate cavity in said interspace;
- impedance means galvanically interconnecting said second and third layers;
- terminal means for connecting a source of charging voltage between said first and second layers;
- circuit means connected between said first and third layers for periodically discharging said pulse-shaping capacitance, thereby exciting a radiation-emitting gas in said elongate cavity; and
- housing means sealing said elongate cavity against the surrounding atmosphere for confining said gas therein under a pressure at least on the order of one bar, said housing means being provided with a window semireflective to the emitted radiation adjacent one end of said elongate cavity and with an opposite reflector for said radiation adjacent the other end of said cavity.

11. A laser comprising:
- a pair of flat nonconductive bodies separated by a narrow interspace, at least one of said bodies being a member with two parallel major faces composed of a ceramic material having a dielectric constant of at least 80 and a Curie point substantially below ambient temperature;
- a first metallic layer on a major face of said member remote from said interspace;
- a second metallic layer in said interspace overlying part of the opposite major face of said member and defining a storage capacitance with said first layer;
- a third metallic layer coplanar with said second layer in said interspace overlying another part of said opposite face and defining a pulse-shaping capacitance with said first layer, said second and third layers having substantially rectilinear confronting edges defining an elongate cavity in said interspace;
- temperature-control means adjacent said member for maintaining said ceramic material at a temperature close to its Curie point;
- impedance means galvanically interconnecting said second and third layers;
- terminal means for connecting a source of charging voltage between said first and second layers;
- circuit means connected between said first and third layers for periodically discharging said pulse-shaping capacitance, thereby exciting a radiation-emitting gas in said elongate cavity; and
- housing means sealing said elongate cavity against the surrounding atmosphere, said housing means being provided with a window transparent to the emitted radiation adjacent one end of said elongate cavity.

12. A laser as defined in claim 11 wherein said ceramic material is KDP.

* * * * *